D. DAY.
TIRE PROTECTOR.
APPLICATION FILED MAY 11, 1908.
933,748.  Patented Sept. 14, 1909.
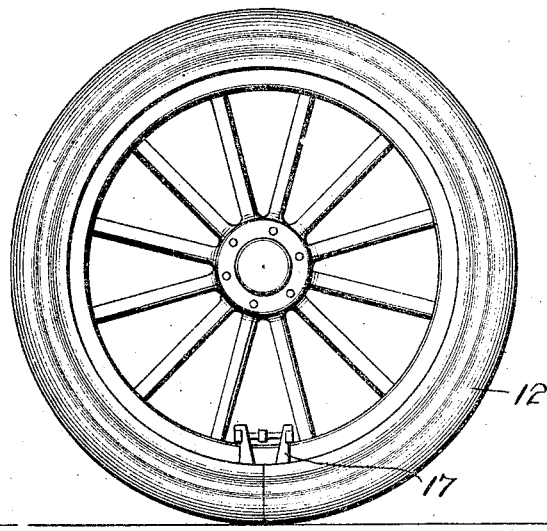
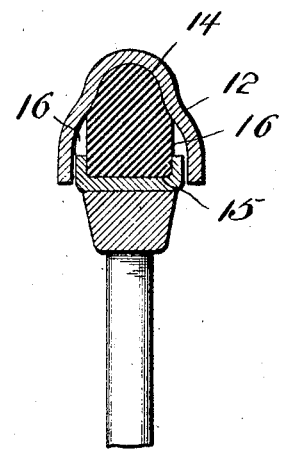
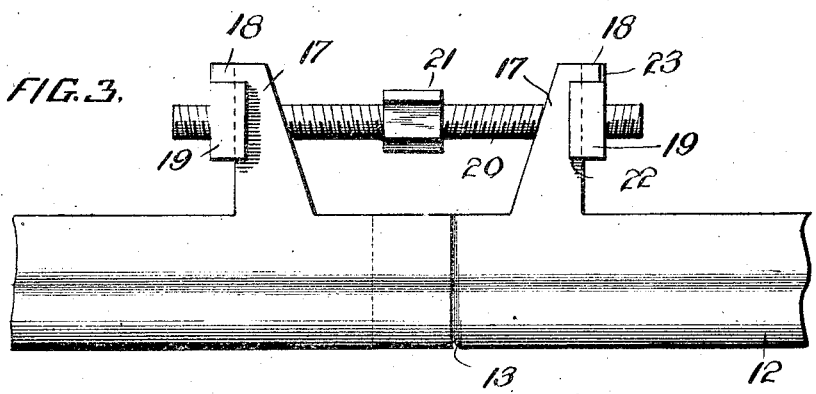
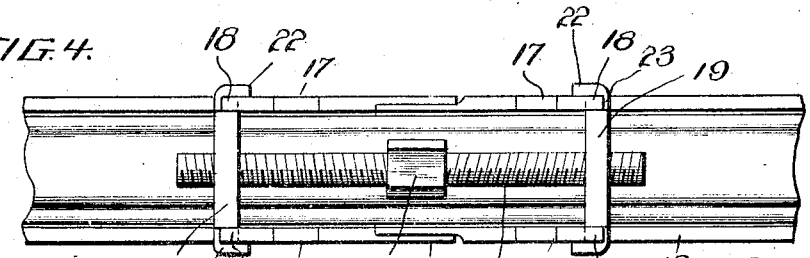
WITNESSES:
INVENTOR
BY
Attorneys

UNITED STATES PATENT OFFICE.

DUFFERIN DAY, OF HUME, OHIO.

TIRE-PROTECTOR.

933,748.  Specification of Letters Patent.  Patented Sept. 14, 1909.

Application filed May 11, 1908. Serial No. 432,257.

*To all whom it may concern:*

Be it known that I, DUFFERIN DAY, a citizen of the United States, residing at Hume, in the county of Allen and State of Ohio, have invented or discovered certain new and useful Improvements in Tire-Protectors, of which the following is a specification, reference being had therein to the accompanying drawings.

This invention relates to a protector for rubber and other resilient vehicle tires adapted to be detachably secured in place upon a vehicle wheel whenever it may be desired to protect the rubber tires from injury when traveling over rough and stony or frozen roads or over sharp ice.

While my invention is adapted for other uses, it is particularly designed for use in connection with the solid rubber tires of carriages and similar vehicles. Such tires, while admirably adapted for use over smooth pavements and roads, are seriously injured and soon rendered unfit for service if it becomes necessary to drive the vehicle over stony or icy roads. For these reasons the use of vehicles equipped with such tires is largely limited to city and village streets, and to the summer season, unless the inconvenience and expense of providing such vehicles with duplicate wheels having steel tires is resorted to.

The objects, therefore, of my invention are to provide a device of the character referred to which will be simple and inexpensive of construction, which can be easily and quickly secured in place or removed, which will be durable in use, and which, when in operative position, will effectually protect the tire from injury without materially impairing the effective resiliency thereof, thereby obtaining the comfort incidental to the use of the rubber tires without injury to such tires.

To these ends my invention comprises certain novel constructions and combinations of parts, all as hereinafter described and particularly pointed out in the claim.

In the accompanying drawings, which illustrate one construction in which my invention may be embodied, Figure 1 is a side elevation of a wheel with my improved protector in operative position thereon, Fig. 2 is an enlarged transverse section through the tire and rim shown in Fig. 1, Fig. 3 is an enlarged elevation of the securing and tightening devices, Fig. 4 is a top plan view of the parts shown in Fig. 3.

The protector 12 will preferably be formed in a single piece of suitable material, preferably sheet steel, of a length sufficient to surround the periphery of the tire and provide slightly overlapping ends 13; and bent into a substantially U-shaped cross-sectional form to inclose the tire 14 and rim 15. The preferred cross-sectional form of the protector 12 is shown in Fig. 2, having a portion of a slightly greater interior width, adjacent the rim 15, than the corresponding width of the tire 14, thereby providing at the sides of the tire 14, suitable open spaces 16, 16 to allow for the lateral expansion of the tire under radial compression, thereby making available substantially the entire resilience of the tire.

As shown in Fig. 2 the vertical depth of the protector 12 is slightly less than the combined vertical depths of the tire 14 and rim 15 or may be substantially equal thereto. This is a preferred although not an essential construction, inasmuch as the same affords a maximum protection for the tire with a minimum amount of material in said protector, thereby making the latter quite light in weight and inexpensive of construction and preventing an unsightly appearance when said protector is in position on the tire.

The protector 12 is provided, adjacent each end, with a pair of preferably integral upstanding lugs or flanges 17, 17, each provided with a rearwardly extending ear or projection 18. The lugs or flanges 17, 17 are adapted to coöperate with the securing and tightening devices comprising a pair of nuts or plates 19, 19 arranged in the rear of and engaging said lugs or flanges 17, 17 and having threaded apertures for the reception of the screw 20 having right and left handed threads and preferably provided with a suitable wrench hold 21. Each of the nuts or plates 19 is preferably provided at its lateral edges with flanges 22, adapted to overlap the lugs or flanges 17, 17, and at its upper corners with notches or recesses 23, for the reception of the ears or projections 18, 18, whereby said nuts or plates are maintained in proper position.

From the foregoing description it will be seen that I have provided a device which can be very cheaply manufactured, as it comprises only four parts all of which are of simple form, and which can be very easily and quickly applied or removed, requiring the manipulation of a single securing device only. It will furthermore be seen that, by virtue of the cross-sectional form of the protector 12, the tire is completely inclosed and thereby fully protected against injury at the sides as well as on the tread portion proper without, however, interfering with the cushioning action thereof. By employing for the material of the protector sheet steel, as is preferable although not essential, these devices, while of low initial cost, are practically indestructible, the flexibility and elasticity of this material moreover having little or no tendency to deaden the resiliency of the rubber tires.

While I, in order that my invention may be readily understood, have shown and described the same as embodied in a particular construction, I wish it to be clearly understood that I do not limit myself to the precise construction shown and described, it being obvious that many changes might be made therein without departing from the spirit and scope of my invention.

Having thus described my invention, I claim as new and desire to secure by Letters Patent:—

In a tire protector in combination, a member of substantially U-shaped form in cross section adapted to surround and completely inclose a tire and having a portion of greater internal width than said tire to permit lateral expansion of the latter within said protector, and of substantially the same or less depth than the combined depth of the tire and rim; a pair of lugs or flanges adjacent each end of said member; a nut or plate arranged in the rear of and engaging each pair of said lugs or flanges; and a right and left handed screw engaging threaded apertures in each of said nuts or plates for drawing said lugs or flanges toward each other, whereby said protector may be directly attached to said tire.

In testimony whereof I affix my signature, in presence of two witnesses.

DUFFERIN DAY.

Witnesses:
 A. M. BOOGHER,
 JACOB FRANTZ.